July 9, 1968                    J. F. COLLINS                    3,392,358
PIEZORESISTIVE MECHANOELECTRIC TRANSDUCERS
Filed Feb. 25, 1965                                    2 Sheets-Sheet 1

INVENTOR
JEROME F. COLLINS
BY
OSTROLENK, FABER, GERB & SOFFEN
ATTORNEYS

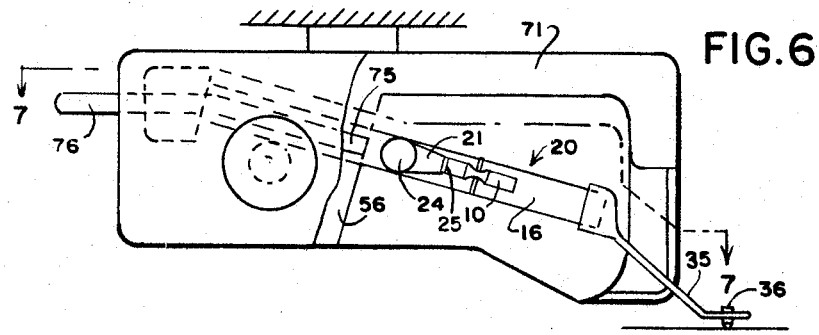
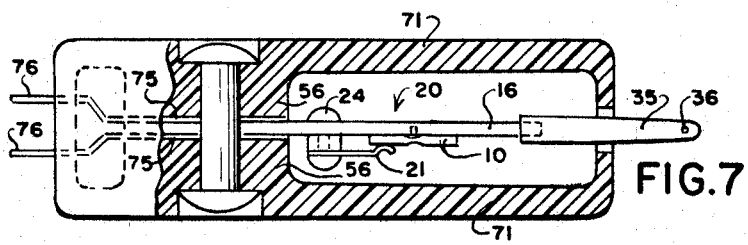
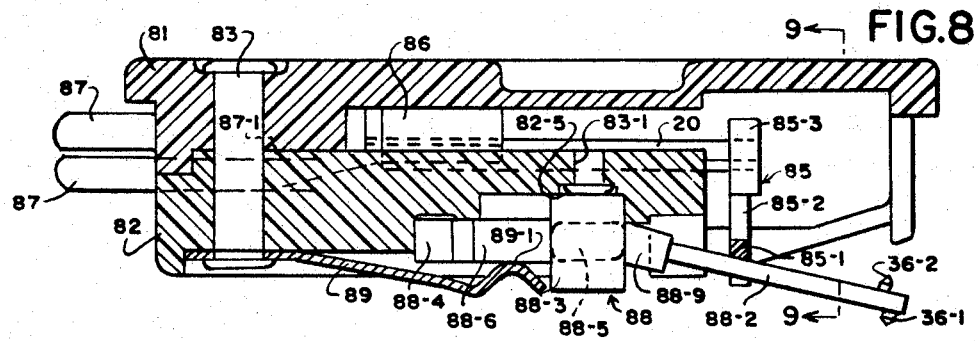
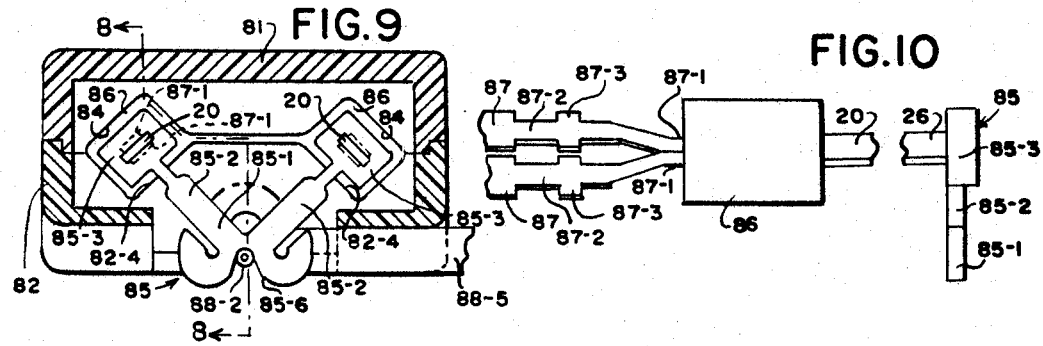
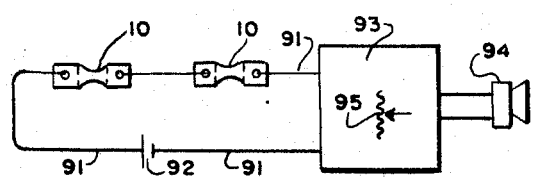

ly Patent Office
3,392,358
Patented July 9, 1968

3,392,358
PIEZORESISTIVE MECHANOELECTRIC TRANSDUCERS
Jerome F. Collins, Westbury, N.Y., assignor to Sonotone Corporation, Elmsford, N.Y., a corporation of New York
Filed Feb. 25, 1965, Ser. No. 435,300
11 Claims. (Cl. 338—2)

This invention relates broadly to piezoresistive mechanoelectric transducers and more specifically to phonograph pickups and other acoustic devices operating with such transducers. The most effective transducer of this type has a thin minute semiconductor piezoresistive crystal element secured with its opposite mounting ends to a strong resilient support member. When such transducer is subjected to substantial deformations, as in a phonograph pickup, its thin crystal element readily fractures.

Among the objects of the invention is such piezoresistive transducer operating with at least one thin fragile semiconductor element that will not fracture when subjected to deformations normally exerted in acoustic devices such as phonograph pickups.

When used in acoustic devices, in phonograph pickups, for example, it is of great advantage to connect the piezoresistive element in a series output circuit including a current supply, such as a battery. This makes it impossible to combine two such piezoresistive elements into a bilaminate connected in such series circuit because their oppositely directed internal strains develop opposite mutually canceling resistance variation and a resulting zero output.

Among the objects of the invention is also a bimorph-type piezoresistive transducer wherein each of the two piezoresistive elements undergo similarly directed variations of resistance in response to oppositely directed internal strains within the two elements. As an example, the resistance of both piezoresistive bimorph elements increases (or both decrease) when one element is tensioned while the other is compressed.

The foregoing other objects of the invention will be best understood from the following description of the exemplifications thereof in connection with the annexed drawings wherein.

Figure 1:
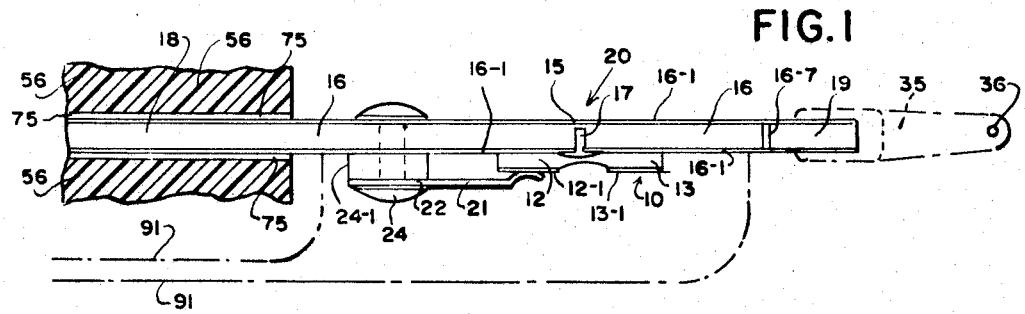
FIG. 1 is a partially diagrammatic side view of a mechanoelectric transducer structure of the invention.
Figure 2:
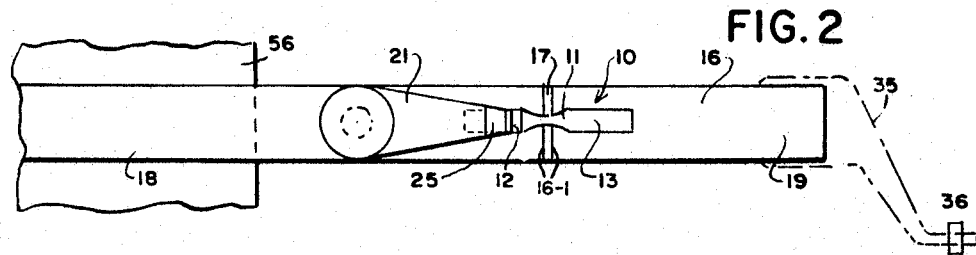
FIG. 2 is an underside plan view of the same transducer unit.
Figure 1A:
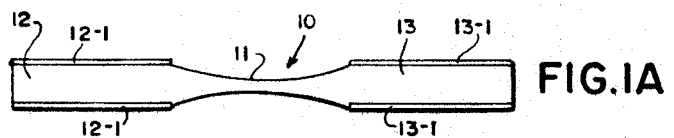
Figure 2A:
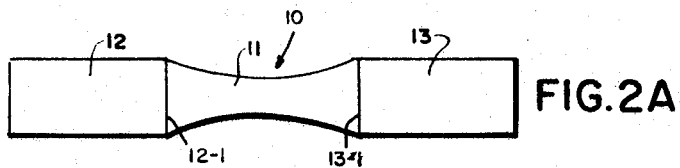
Figure 3:
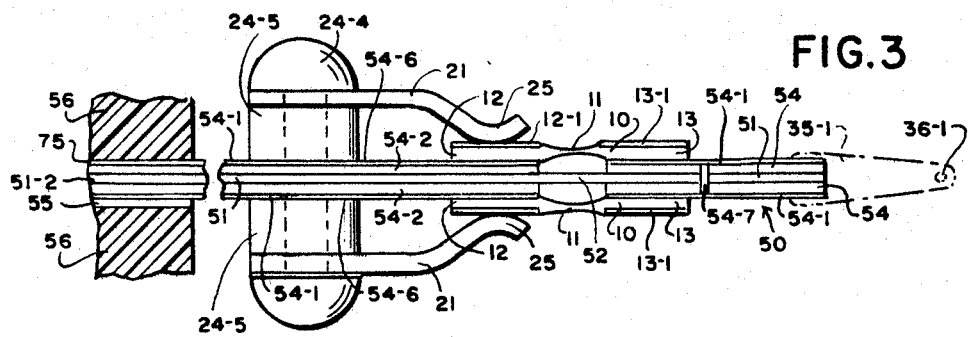
Figure 4:
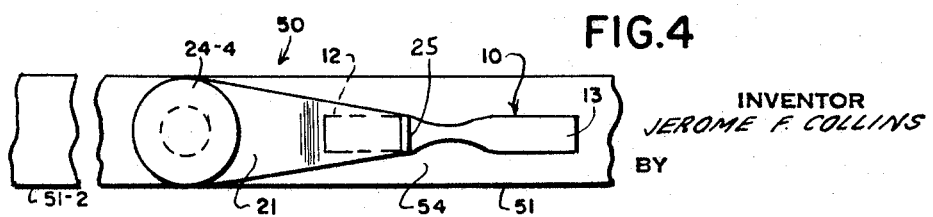

FIGS. 1-A and 2-A are views similar to FIGS. 1 and 2 of the piezoresistive crystal element only;

FIGS. 3 and 4 are views similar to FIGS. 1 and 2 of a similar bilaminate-type transducer structure of the invention;

FIG. 5 is a circuit diagram illustrating one way in which mechanoelectric transducers of FIGS. 1 and 2 or of FIGS. 3 and 4 may be used as part of acoustic transducer, such as a phonograph pickup;

FIG. 6 is a partially cross-sectional side view of a monophonic phonograph pickup operating with a transducer of the invention;

FIG. 7 is a cross-sectional view along lines 7—7 of FIG. 6;

FIG. 8 is a vertical cross-sectional view, along lines 8—8 of FIG. 9, of a stereophonic pickup operating with two piezoresistive transducers of the invention, such as described in connection with FIGS. 1 and 2 or 3 and 4, for example;

FIG. 9 is a cross-sectional view along line 9—9 of FIG. 8, and FIG. 10 is a side view of the transducer-stylus-coupler assembly of FIGS. 8 and 9.

U.S. Patent 1,819,083 of W. H. Edwards discloses a phonograph pickup using a semiconductor copper oxide junction as the stylus driven transducer connected in series with a direct-current source for supplying an output corresponding to the stylus motion. U.S. Patent 2,568,673 of Washburn discloses a phonograph pickup using a stylus driven piezoresistive transducer element having two wide portions and an intermediate narrower effective transducer portion to which the output generating strains are transmitted. The paper by W. P. Mason and R. N. Thurston, "Use of Piezoresistive Materials in the Measurement of Displacement, Force and Torque," published in the Journal of the Acoustical Society, vol. 29, pp. 1096–1101, October 1957, explains that piezoresistive transducers of crystalline semiconductor bodies are of greatly increased sensitivity. U.S. Patent 3,034,345 of W. P. Mason describes strain gauge bimorphs wherein two pairs of elongated flat semiconductor crystaline strips are affixed with their opposite conductively coated terminal ends to a strong resilient plastic support sheet and connected in a current-supplied balanced bridge circuit to develop at two diagonal bridge terminals an output proportional to the strains transmitted by the support sheet to the effective center portions of the four crystal elements. In later strain gauges of this type, the crystalline semiconductor strip was given higher sensitivity by reducing the cross-section of its effective center portion to a fraction of its terminal portions. When such crystal strain gauge structure is utilized as an acoustic transducer, for example, in a phonograph pickup, it is subjected to substantial deformation which results in fracture of their flat thin crystal elements.

When used in acoustic devices it is of great advantage to connect the piezoresistive element in a series output circuit including a current source, usually of the direct-current type, such as a battery cell. When such piezoresistive elements are combined into a bimorph, such as described in said Mason Patent 3,034,345, deflection thereof subjects one piezo resistive element to tension while the other element is subjected to compression which produce mutually canceling oppositely-directed variations of their resistance variations and zero circuit output.

The present invention aims to overcome the above described difficulties heretofore encountered with such piezoresistive transducers.

For sake of clarity some of the dimensions are shown exaggerated in the drawings.

FIGURES 1 and 2 show one form of a piezo resistive transducer 20 exemplifying the invention. Before explaining its inventive features there will be first described in connection with these figures and also with the auxiliary FIGURES 1-A and 2-A one practical form of prior art high-sensitivity strain gauge of the same general shape and operating with the same basic elements of the transducer of FIGS. 1 and 2. It has a piezo resistive element 10 consisting of a flat elongated silicon strip 0.120" long, 0.014" wide and 0.005" thick. Its effective central portion 11 is 0.004" long and is reduced in cross section to increase its sensitivity having a width of 0.007" and thickness 0.001" only. Central element portion 11 has two wider terminal end portions 12, 13 each of which is coated with an electrically conductive coating 12–1, 13–1, such as gold, united thereto in a conventional way. The resistor silicon element 10 is positioned with its plated flat side along a flexible center portion 15 of a strong resilient supporting member 16 which in the form shown is of insulating material. In the form in which such strain gauges are available, the resilient supporting strip consists of fiberglass insulating sheet material of the type used in printed circuit boards.

In the practical form shown, the supporting member 16 is 0.625" long, 0.050" wide, and 0.020" thick. To give it the desired flexibility the resilient supporting strip portion 15 facing the central effective silicon portion 11 is provided with a slot 17, 0.008" wide and a depth which reduces the remaining thickness of its support portion 15 to about 0.003 to 0.002" thickness.

In applying such transducer unit 20 for acoustic transducers, for instance, to a phonograph pickup, one strip end 18 thereof is held clamped as between two mutually insulated clamping members 56 of a pickup housing structure while its opposite end 19 is held free for actuation by a driving force imparted thereto as by a stylus arm 35 having a coupling portion, such as a socket, secured thereto, as by cement, and carrying a stylus 36 which is undulated by a record groove. When used in such acoustic devices, the highly fragile piezo resistive crystal element 10 readily fractures making their use in such applications very difficult.

In accordance with the invention, such fracture difficulties heretofore encountered with the crystalline piezo resistive transducer are overcome and their fracture minimized by holding at least one terminal portion of the crystalline transducer element affixed to its support—not by an unyielding junction such as cement or solder—but by force means which hold the crystalline terminal portion frictionally affixed to the facing surface of the support member 16 throughout the normal range of transducer strains applied to the crystal element while permitting such frictionally affixed crystal terminal portion to move along its frictionally engaged support surface under predetermined applied excessive applied strain and thereby preventing or suppressing the otherwise caused fracture of the fragile piezo resistive element 10.

FIGS. 1 and 2 show one form of such piezoresistive crystalline transducer unit exemplifying the invention with only one terminal portion thereof, for instance, terminal portion 13 of the crystal element 10 affixed as by solder or cement to the facing surface of the resilient supporting strip member 16. Since resilient supporting members 16 of the type shown are supplied with metalized surfaces, the facing surface of supporting member 16 to which crystal terminal portion is affixed may be joined thereto by solder. This may be done by applying to the surfaces to be soldered a thin coating of solder so that after the superposed facing surface portion of the crystal terminal portion 13 and support member 16 are heated to the solder melting temperature, they are affixed to each other by the solidified solder joint.

In accordance with the invention, the other terminal portion 12 of crystal element 10 is held affixed to the facing surface of supporting member 16 by frictional forces of a magnitude which assures that they will remain frictionally affixed over a normal range of applied strains applied to crystalline element 10 by driving forces imparted thereto by a stylus driven support member 16, for instance, in reproducing and playing back records throughout the entire frequency and amplitude range used in such records.

FIGURES 1 and 2 show one manner in which crystal terminal portion 12 may be held so frictionally affixed to the facing surface of support member 16. A force supplying member 21 shown in the form of a spring strip 21 has a wider rear end 22 which is suitably affixed to the facing support portion of support member 16. Such affixing may be done by any known fastening means such as by soldering the rear end spring portion 22 to a metallic spacing member 24–1 which in turn is affixed, as by solder, to the facing metalized surface of support portions, assuming that spring 21 is of metal, for example. Alternatively, the spring end 22 and its spacer 24–1 may be affixed to the underlying support by a suitable cement, such as by epoxy cement. In the form shown, the spring-member rear end 22 is affixed to a support member portion 23 by a conventional rivet 24. The rivet 24 may be a conventional metal, such as brass or a ductile or aluminum alloy.

To simplify the description of the transducer 20 of the invention shown in FIGS. 1 and 2, its flat support member surface carrying the crystal 10 is designated as its front side and its opposite side as the rear side. The two metalized strip coatings 16–1 on the front side of the support member 16 are insulated from each other along its center portion 15 facing the central effective length 11 of crystal element 10, and these two metalized front surfaces 16–1 serve as terminal connections to the two metalized crystal terminal portions 12 and 13. The rear side surface of support member 16 (facing upwardly in FIG. 1) may be metalized along the major part or over its substantialy entire length and connected by a metallic bridging connection 16–7 to metalized support front surface 16–1 to which crystal terminal portion is metallically joined and affixed. In this way the two opposite metalized surfaces 16–1 on the left end region of transducer unit 20 constitute the two opposite polarity terminals of the transducer unit, in which case the two clamping members 56, should be electrically insulated from each other. These two insulated clamping members 56 may also serve to hold clamped to the two underlying mutually insulated metalized surfaces 16–1 of support member 16 two metallic sheet terminals 75.

With such opposite metalized crystal terminal connections on the left side of transducer unit 20, care should be taken that the surface of the support member adjoining the opening through which the shank of rivet 24 passes shall not have a metalized coating to eliminate any metallic connection to the opposite rear side metalized coating 16–1 of support member 16 to which crystal terminal portion 13 is soldered.

The front end of spring member or element 21 is angularly bent to form a spring projection or lip 25 which is elastically biased to exert on the underlying crystal terminal portion 12 elastic clamping forces which maintain it affixed against the underlying surface portion 26 of support member 16 with the predetermined frictional force specified above.

Without thereby limiting the invention, but in order to enable ready practice thereof, there are given below data of one practical spring force arrangement—for the specific example of the transducer unit 20 described above—which maintains crystal terminal portion 12 affixed to the facing resilient support member portion 16 for all force motions transmitted thereto by a phonograph stylus driven by a record groove over the entire frequency and amplitude range of the entire audible frequency range.

The spring element 21 is formed of beryllium copper known as No. 2% Be-Cu which is heat treated for two hours to give it full hardness. The thickness of the spring strip is 0.0015" and its length is 0.100". The wider end portion which is affixed to the support by rivet 24 has a hole 0.025" diameter and its square area edges are 0.050" long. The rectangularly bent narrow front end is 0.025" wide and the bent end 25 has a transverse height of 0.025 inch.

Except for the opposite surfaces of the insulating portions 15 of support member 16, the entire remaining opposite exposed flat surfaces of support member 16 are metalized in a conventional way with metalized coatings 16–1 which provide mutually insulated terminal connections or surfaces for the two terminal sections 12 and 13 of piezoresistive crystal element 10. FIGURE 1 shows by lines 91 two alternative circuit leads connected, as by solder joints, to the two mutually insulated metalized terminal surfaces 16–1 which are connected to the two crystal terminal portions 12 and 13.

FIGURE 5 shows diagrammatically a simplified operating circuit for a transducer of FIGS. 1 and 2. It has two similar piezoresistive transducer crystal elements 10 operating with aiding strain output which are serially connected through leads 91 including a conventional circuit supply, and a battery 92 and current limiting resistor 95 of an input circuit which supplies an amplifier 93. The amplifier 93 delivers a corresponding amplified output to a device, such as a speaker 94. The amplifier 93 includes a conventional volume control 95. If the system of FIG. 5 is to play back a phonograph record with a transducer of the type shown in FIGS. 1 and 2, only one crystal element 10 is used for playing back the record over its entire frequency and amplitude range. Instead of a separate battery 92, the current supply for the piezoresistor circuit 91 may be provided, for instance, by direct current supply of the amplifier 93 such as used, for example, in conventional transistor phonograph amplifier circuits. If the transducer is operating with two aiding piezoresistive crystal elements 10, they may be connected in aiding relation in such input circuit 91, for instance, in the series aiding circuit 91 of FIG. 5.

In general, silicon and germanium elements for use in transducer structures of the present invention should be cut from a single crystal with its longitudinal axis oriented parallel to a [111] direction (Miller indices). An exception is N-type silicon which is most sensitive along the [100] direction. Crystal elements of p-type silicon or p-type germanium have a positive gauge factor and their resistance increases under tension and decreases under compression. Crystal elements of n-type silicon and n-type germanium have a negative gauge factor and their resistance decreases under tension and increases under compression.

Heretofore known, bilaminates having two piezoresistive semiconductor crystal elements, such as the two crystal elements 10, could be connected in a series aiding circuit relation such as shown in FIG. 5. This is due to the fact that a deformation strain imparted to such bilaminate transducer subjects one transducer crystal 10 to tension and the other transducer crystal to compression strain causing one crystal to increase and the other to decrease its resistance (for example) which opposite resistance variation give zero resistance variation and zero output when these crystals are connected in an aiding circuit, such as shown in FIG. 5. This makes is necessary to operate such prior bilaminate crystal transducers with bridge circuits such as described in aforesaid Mason et al. paper or said Mason U.S. Patent No. 3,034,345.

The present invention overcomes the need for such bridge circuits in connection with bimorph-type piezoresistive crystal transducers. In accordance with the invention, the bimorph transducer operating with two piezoresistive crystal elements subjected to oppositely directed strains is formed with two crystal elements having opposite gauge factors so that under such oppositely directed internal strains they are subjected to similarly directed resistance variations. Thus, in such bimorph piezoresistive crystal transducer of the invention one crystal element has a positive gauge factor and increases its resistance under tension, while its other crystal element has a negative gauge factor and likewise increases its resistance although under compression and vice-versa. Accordingly, when the two crystal elements of such bimorph transducers are connected in an aiding circuit including a current supply, they will develop aiding output under successive alternations of the oppositely directed internal strains developed in the two crystal elements. As an example, such bimorph piezoresistive transducer of the invention may combine a p-type silicon element which has a gauge factor +175 with an n-type germanium element which has a gauge factor −157, and such two bimorph crystal elements well undergo similarly directed resistance changes under opposite internal strains.

FIGS. 3 and 4 show, on a greatly enlarged scale, with some dimensions exaggerated for clarity, one exemplification of a bilaminate or bimorph transducer of the invention operating with two similarly shaped piezoresistive semiconductor crystal elements 10. Each crystal element 10 of FIGS. 3 and 4 may be identical in shape and operating characteristics with the crystal element 10 of FIGS. 1 and 2, except that one crystal element 10, for example, the upper crystal element 10 has a positive, while the lower crystal element 10 has a negative gauge factor. As an example, the upper crystal element may consist of p-type silicon having a positive gauge factor +175 and its resistance increases under longitudinally applied tension and decreases under similar compression. The underlying other crystal element 10 may consist of n-type germanium having a negative gauge factor −157 and its resistance decreases under longitudinal tension and increases under similar compression. As a result, a bilaminate formed of two such opposing-gauge-factor piezoresistive crystalline elements 10 will cause them to undergo similarly directed changes of resistance when subjected to opposing internal strains in a transducer similar to that of FIGS. 1 and 2 and causes them to develop aiding output in a circuit 91 of FIG. 5.

Otherwise, the two crystal elements 10 have the same shape, characteristics and structural features which are designated by the same reference numerals as in crystal element 10 of FIG. 1. The two crystal elements 10 are held with their metalized flat surfaces along opposite surface portions of a resilient strong support member 50 corresponding to support member 16 of the transducer of FIGS. 1 and 2. The support member 50 shown consists basically of a thin highly flexible elastic metal strip 51 having an intermediate or central highly flexible strip element 52 underlying effective central crystal elements 11 of the two crystal elements 10, held along opposite surfaces of support strip 51.

The two end strip section 51–1, 51–2 of the metal strip 51 extending to the left and right of central strip element 52 are coated along their opposite surfaces or have affixed thereto two outside insulating layers 54–1 and 54–2 which make these two strip portions stiffer than its highly flexible central portion 52. Any stable plastic electrically insulating sheet material may be used for these insulating layers selected, for example, from the Modern Plastics Encyclopedia, 1963 issue, pgs. 556, 557 containing a "Film Chart" giving the characteristics of different plastic films. Referring to this Film Chart, examples of suitable insulating coatings 54 include polyester film (available under the trademark "Mylar"), acrylonitrile styrene copolymer, polymethyl methacrylate, high-impact high-heat polystyrene, and the various plastics used in making tapes for magnetic records which are coated with a minutely thin coating of a plastic composition containing permanently magnetizable powder and such plastic coating media. Such plastic insulating films 54–1, 54–2 are affixed to the underlying surfaces of central metal support strip 51 with any suitable known cement, for instance, of the type used for the magnetic coating of magnetic recording tapes.

The outside surfaces of each of the two outside support insulating layer sections 54–1, 54–2 are coated in a conventional way with a metalized coating 54–6 except for their portions underlying the fastening rivet 24–4 and its spacer 24–5 (corresponding to similar elements 24 and 24 of FIGS. 1 and 2) if they are formed of metal.

The metalized outer surfaces 54–6 of the two insulating layers 54–1 affixed to rightward metal strip section 51–1 may be conductively bridged as by a metalized connection 54–7 which completes a connection between the two inward metalized terminal portions 13–1 of the two piezoresistive crystal elements 10(+) and 10(−), for connecting them, for instance, in series in a circuit such as shown in FIG. 5.

The metalized opposite terminal portions of each of the two crystal elements 10(+), 10(−) are likewise affixed to the facing metalized surfaces 54–6 of their respective underlying insulating layers 54–2 of left-side interior metal support strip section 51 (FIG. 3). The metalized underside surface of each metalized terminal portion 12 of each crystal element 10(+) and 10(−) is held affixed to the underlying metalized surface of respective insulating strip 54–1, 54–2 by frictional forces exerted on its outside surface which forces have same characteristics applied to crystal terminal portion 12 of FIGS. 1 and 2 as explained above.

FIGS. 3 and 4 show an example of two elastic springs 21 held affixed against opposite outside surfaces of the support strip 51, as by a common rivet 24–4 and suitable spacers 24–5 corresponding in every respect to the similar spring 21 and rivet 24 of FIGS. 1, 2. If no metallic connection is to be affected by the rivet 24–4 and spring 25 as in the example shown in FIGS. 3 and 4, the surface of each spring end 25 facing its crystal terminal portion 12 is coated with a strong stable plastic insulating compound, for example, a copolymer of tetrafluoroethylene and hexifluoropropylene available under the trademark "Teflon." Similarly, the end surfaces of rivet spacer 24–5 are coated with a similar insulating but not flowable plastic material. The shank of rivet 24–4 is coated with a similar noninsulating plastic or alternatively, if made of aluminum, and the surface of the rivet shank is anodized with an aluminum oxide coating to provide the required insulation from the metallic strip section 51 and from the metalized coatings 54–6 of its two insulating layers.

Semiconductor piezoresistive crystal bodies other than of silicon or germanium may be used for the transducers of the invention described above. As examples, they include analogous crystals of indium antimonide, gallium arsenide, silicon carbide, aluminum antimonide, aluminum arsenate, aluminum phosphide, gallium antimonide, gallium phosphide, indium arsenate, and other semiconductor bodies having similar piezoresistive properties.

At the present, in applications such as phonograph pickups, good results are obtained with only one crystal unit held on its support by frictional engagement force in accordance with the invention as described above in connection with FIGS. 6 and 7. However, it may be desirable to hold both terminal ends of such piezoresistive crystal frictionally affixed in the same way with thin respective support surfaces.

Piezoresistive crystal units of the invention, such as described in connection with FIGS. 1 and 2, and with FIGS. 3 and 4 may be used in any known acoustic device operating with piezoelectric transducer strip. When so used it is merely necessary to substitute for the piezoelectric transducer strip a piezoresistive transducer of the present invention such as above described. The mounting end of such crystal transducer unit, for example, the left end of either that of FIGS. 1, 2 or that of FIGS. 3, 4, may be surrounded by a clamping collar of elastomer material together with its two outwardly projecting terminals as disclosed in Klingener U.S. Patent 2,717,929 or in Dieter et al. U.S. Patent 2,955,170. The so elastomer-collar embraced end region of such piezoresistive transducer unit is then held clamped within and between walls of a pickup housing, together with metallic terminal strip overlying the two embraced outside metalized surfaces 16–1 of such transducer for holding it in operative position within the pickup housing. Furthermore, since the supporting strip 16 (or strip 51 of FIGS. 3, 4) of such transducer unit is strong, its rear end 18 may be forcefully clamped between hard clamping bodies of the housing assembly as described in connection with FIGS. 6 and 7 for a conventional monophonic pickup, which clamping arrangement may also be used for stereophonic pickup.

Referring to FIGS. 6 and 7, the two conventionally assembled side walls 71 of a monophonic pickup are, for example, similar to those described in U.S. Patent 2,840,-644 of H. F. Klingener. The two pickup sidewalls 71 of such pickup are shown with inwardly projecting substantially rigid clamping walls 56 (as described above in connection with FIGS. 1 and 2) for holding clamped therebetween the rear end 18 of the strong resilient support strip 16 of the transducer 20 of FIGS. 1 and 2. The two clamping members 56 may embody or have at their inward surfaces thin spacer shims 75 for simplifying the assembly. Each spacer shim may be formed of a suitable slightly curved metal strip or have outwardly bent spring tongues which when clamped are deformed to a smaller thickness for assuring firm clamping of support-strip rear end 18 without necessitating accurate-fit dimensioning of the housing wall clamping members 56. These metallic spacer shims 75 may have terminal strips 76 which project in a conventional way beyond the housing for connecting the transducer terminals to an operating circuit, such as shown in FIG. 5.

Similar considerations apply to operative mounting two such transducers 20 in a stereophonic pickup, an example of which is shown in FIGS. 8 to 10 and similar to those described in U.S. Patent 3,236,956 of Kantrowitz.

Referring to FIGS. 8 to 10, they show one example of a stereophonic phonograph pickup represented by its relatively rigid housing 80 and operating with two piezoresistive crystal transducer units 20 of the invention as described above in connection with FIGS. 1, 2 or 3 to 5. The pickup housing or mounting structure 80 comprises two complementary housing walls, consisting of upper housing wall 81 and bottom housing wall 82 which are suitably affixed to each other, as by two rivets 83 and 83–1. The two housing walls 81, 82 form two transducer compartments 84 in which the two elongated transducer units 20, with their support strips are operatively held with their planes inclined to 45° to the horizontal and 90° to each other.

FIG. 10 is an exploded diagrammatic view of the transducer assembly comprising the two transducers 20 and their associated operative members which are placed as a unit in operative positions within the housing 80 between its two walls 81, 82. It comprises a conventional integrally formed V-shaped stylus-to-transducer coupler 85 of the type described in aforesaid Keller et al U.S. Patent 2,114,471 or German Batch Patent 971,346. This stylus coupler 85 has at its bottom a stylus holding or engaging coupling center portion 85–1 with two 90° inclined arms 85–2 which are stiff in the direction of their length and have at their outward upper ends two transducer-engaging coupling ends 85–3. The two coupler arms 85–2 are pivotally joined to their central stylus coupler 85–1 and to their respective two transducer couplers 85–5 for resolving the composite stylus motion into two 90° displaced motion components transmitted to the two transducers 20 for generating therein two distinct stereophonic signals corresponding to the stereophonic record groove engaged by the stylus 36–1.

The rearward mounting end 18 of each transducer unit 20 may be held tightly clamped in its operative position by two facing inwardly projecting clamping wall portions corresponding to wall projections 56 of the pickup housing walls 71 of the pickup of FIGS. 6 and 7. As an alternative, the rear end of each transducer unit 20 is held embraced within a tubular elastomer body 86 (FIGS. 8 and 9) of generally rectangular cross-section which fits within the respective housing space 84 wherein the overlying housing walls 81, 82 hold it clamped therein for maintaining the major forward length of each transducer beam 20 in operative vibratory position wherein they are driven by the two resolver arms 85–2 of the stylus coupler 85.

Referring to FIGS. 8, 9 and 10, embracing clamping body 86 of each transducer unit holds also the inward metallic contact ends 87–1 of two conventional metallic contact strips 87 in contact engagement with the metalized exterior terminal surfaces of the two opposite surfaces of the transducer support strip 16 in a manner analogous to corresponding elements of FIGS. 6 and 7 and the conventional practice in similar pickups operating with thin flat piezoelectric transducers. Intermediate portions 87–2 of each contact strip are held clamped between overlying closely spaced wall surfaces of the two housing walls 81, 82. These intermediate contact strip portions 87–2 have also locking portions 87–3 held interlocked with corresponding locking recesses of the housing walls 81, 82 for preventing their forceful withdrawal from their operative position shown.

Although the center 85–1 of the stylus-to-transducer coupler 85 may carry the groove engaging stylus rod or stylus, the coupler center 85–1 is provided at its downward side with a coupling recess 85–6 shaped for detachable coupling with a stylus carrying rod 87–2 of a detachable stylus holder 88 of the type disclosed in Klingener U.S. Patent 2,717,929 or the new type detachable stylus holder of Kantrowitz, U.S. Patent 3,236,956, both assigned to the assignee of the present application.

Referring to FIGS. 8 and 9, the stylus holder 88 has a light forwardly extending stylus rod 88–2 carrying at its front end two differently or oppositely directed styli 36–1, 36–2. The stylus rod 88–2 is carried in alignment with its transducer coupling axis shown by the generally-parallel stiff or rigid main elongated stylus holder body 88 which constitutes its seating section. The stylus seating body has a rotary surface portion 88–3 shaped for rotation on corresponding rotary surface of housing seating recess 82–5. A handle 88–5 laterally extending from rotary seating portion 88–3 serves to rotate the stylus rod 88–2 with its two styli to its different or opposite stylus positions.

Stylus holder body 88 has a bias section 88 with opposite flat surfaces engaged by a wide free spring end or nose 89–1 of an elastically deformable retainer and bias spring 89, the opposite end of which is affixed to overlying casing by casing rivet 83. The flat bias section spring and 89–1 section in position of FIG. 8 has the same width as the wide rotary seating section 88–6 of seating member 88. The wide spring nose 89–1 engages the full width of flat and wide seating-member bias section 88 for retaining the rotary stylus holder 88 either in the stylus position shown or in the opposite stylus position wherein its opposite wide flat bias surface engages the bias section 88–6 of the stylus holder 88. This stylus holder bias section 88–6 cooperates with retainer spring 89 in a manner analogous to laterally displace bias section 68 of stylus holder 65 and the cooperating retainer spring 78 of the pickup disclosed in Sobel U.S. Patent 2,798,120.

Stops formed by recessed surfaces 82–8 in downwardly facing housing wall portions 82–8 of bottom housing wall 82 fix the opposite limits to which stylus-holder handle 85–5 is turned when its flat bias section 88–6 is moved past a 90° neutral position when turned from one to the opposite stylus position.

The principles underlying the invention described in connection with specific exemplifications will suggest other modifications thereof. It is accordingly desired that the appended claims shall not be limited to specific examples shown or described herein.

What is claimed is:
1. In a mechano-electric strain transducer,
  an extended resilient member of substantial strength having two remote portions and an intermediate portion subject to strains transmitted thereto,
  a thin and fragile crystalline element of a volume and strength much smaller than said resilient member having two opposite terminal portions and an effective intermediate crystal portion, the resistance of which varies in a predetermined manner in response to strains transmitted by the two terminal portions thereof,
  said crystalline element being carried on one side of said member and having the inner side of its two terminal portions affixed to the facing surface of said member for transmitting force strains applied to said member to said terminal portions,
  and force means exerting holding forces on the outer side of one of said two terminal portions and holding the inner side of said one terminal portion frictionally engaged with and affixed to the facing surface of said member over a predetermined normal strain range applied to said element and causing said frictionally held terminal portion to move along said frictionally engaged surfaces in response to predetermined excessive applied strain exceeding said normal strain range.

2. In a mechano-electric strain transducer,
  an extended resilient member of substantial strength having two remote portions and an intermediate portion subject to strains transmitted thereto,
  a thin and fragile crystalline element of a volume and strength much smaller than said resilient member having two opposite terminal portions and an effective intermediate crystal portion, the resistance of which varies in a predetermined manner in response to strains transmitted by the two terminal portions thereof,
  said crystalline element being carried on one side of said member and having the inner side of its two terminal portions affixed to the facing surface of said member for transmitting force strains applied to said member to said terminal portions,
  and force means exerting holding forces on the outer side of one of said two terminal portions and holding the inner side of said one terminal portion frictionally engaged with and affixed to the facing surface of said member over a predetermined normal strain range applied to said element and causing said frictionally held terminal portion to move along said frictionally engaged surfaces in response to predetermined excessive applied strain exceeding said normal strain range,
  said force means comprising an elastic spring member having a mounting portion affixed to said resilient member and a force portion overlying and exerting said holding forces on said one terminal portion.

3. In a mechano-electric strain transducer,
  an extended resilient member of substantial strength having two remote portions and an intermediate portion subject to strains transmitted thereto,
  a thin and fragile crystalline element of a volume and strength much smaller than said resilient member having two opposite terminal portions and an effective intermediate crystal portion, the resistance of which varies in a predetermined manner in response to strains transmitted by the two terminal portions thereof,
  said crystalline element being carried on one side of said member and having the inner side of its two terminal portions affixed to the facing surface of said member for transmitting force strains applied to said member to said terminal portions,
  and force means exerting holding forces on the outer side of one of said two terminal portions and holding the inner side of said one terminal portion frictionally engaged with and affixed to the facing surface of said member over a predetermined normal strain range applied to said element and causing said frictionally held terminal portion to move along said frictionally engaged surfaces in response to predetermined excessive applied strain exceeding said normal strain range,
  said effective intermediate crystal portion having only a fraction of the cross-section and being of more easily fractured material than its said two terminal portions.

4. In a mechano-electric strain transducer,
  an extended resilient member of substantial strength having two remote and an intermediate portion subject to strains transmitted thereto,
  a thin, flat and fragile crystalline element of a volume and strength much smaller than said resilient member having two opposite terminal portions and an effective intermediate portion the resistance of which varies in a predetermined manner in response to strains transmitted by the two terminal portions thereof, said crystalline element being carried on one side of said member and having the inner surface of one of said two terminal portions affixed to the facing surface of said member for transmitting force strains applied to said member to said terminal portions, and force means exerting holding forces on the outer side of one of said two terminal portions for holding the inner side of said one terminal portion frictionally engaged with and affixed to the facing surface of said member over a predetermined normal strain range applied to said element and causing said frictionally held terminal portion to move along said frictionally engaged surfaces in response to predetermined excessive applied strain exceeding said normal strain range and suppressing transmission of excessive strains to said effective crystal portion, said force means comprising an elastic spring member having a mounting portion affixed to said resilient member and a force portion overlying and exerting said holding forces on said one terminal portion.

5. In a mechano-electric strain transducer, an extended resilient member of substantial strength having two remote portions and an intermediate portion subject to strains transmitted thereto, a thin and fragile crystalline element of a volume and strength much smaller than said resilient member having two opposite terminal portions and an effective intermediate crystal portion, the resistance of which varies in a predetermined manner in response to strains transmitted by the two terminal portions thereof, said crystalline element being carried on one side of said member and having the inner side of its two terminal portions affixed to the facing surface of said member for transmitting force strains applied to said member to said terminal portions, and force means exerting holding forces on the outer side of one of said two terminal portions and holding the inner side of said one terminal portion frictionally engaged with and affixed to the facing surface of said member over a predetermined normal strain range applied to said element and causing said frictionally held terminal portion to move along said frictionally engaged surface in response to predetermined excessive applied strain exceeding said normal strain range, said force means comprising an elastic spring member having a mounting portion affixed to said resilient member and a force portion overlying and exerting said holding forces on said one terminal portion, said effective intermediate crystal portion having only a fraction of the cross section and being of more easily fractured material than its said two terminal portions.

6. In a mechano-electric strain transducer, an extended resilient member of substantial strength having two remote portions and an intermediate portion subject to strains transmitted thereto, two thin fragile crystalline elements of a volume and strength much smaller than said resilient member, each having two opposite terminal portions and an effective intermediate crystal portion the resistance of which varies in a predetermined manner in response to strains transmitted by said two terminal portions, said two crystalline elements being disposed with facing inner side on opposite sides of said member and each having the inner sides of its said terminal portions affixed to facing surface portions of said member for transmitting to said two effective element portions opposing strains in response to force strains applied between said remote member portions, said two crystalline elements having opposite gauge factors causing said two elements to be subjected to similarly directed resistance variations in response to oppositely directed internal strains within said two elements, and force means exerting holding forces on the outer side of one of said two terminal portions of each of said two crystalline elements and holding the inner side of said one terminal portion frictionally engaged with and affixed to the facing surface of said member and suppressing motion of said one terminal portion along its frictionally engaged member surface over a predetermined normal strain range applied to said element, said holding forces causing each said frictionally affixed terminal portion to move along said frictionally engaged member surface in response to predetermined excessive strains exceeding said normal strain range and suppressing application of excessive strains to said element.

7. In a mechano-electric strain transducer, an extended resilient member of substantial strength having two remote portions and an intermediate portion subject to strains transmitted thereto, two thin fragile crystalline elements of a volume and strength much smaller than said resilient member, each having two opposite terminal portions and an effective intermediate crystal portion the resistance of which varies in a predetermined manner in response to strains transmitted by said two terminal portions, said two crystalline elements being disposed with facing inner side in overlapping relation on opposite sides of said member and each having the inner sides of its said terminal portions affixed to facing surface portions of said member for transmitting to said two effective element portions opposing strains in response to force strains applied between said remote member portions, said two crystalline elements having opposite gauge factors causing said two elements to be subjected to similarly directed resistance variations in response to oppositely directed internal strains within said two elements, and force means exerting holding forces on the outer side of one of said two terminal portions of each of said two crystalline elements and holding the inner side of said one terminal portion frictionally engaged with and affixed to the facing surface of said member and suppressing motion of said one terminal portion along its frictionally engaged member surface over a predetermined normal strain range applied to said element, said holding forces causing each said frictionally affixed terminal portion to move along said frictionally engaged member surface in response to predetermined excessive strains exceeding said normal strain range and suppressing application of excessive strains to said element.

8. In a mechano-electric strain transducer, an extended resilient member of substantial strength having two remote portions and an intermediate portion subject to strains transmitted thereto, two thin fragile crystalline elements of a volume and strength much smaller than said resilient member, each having two opposite terminal portions and an effective intermediate crystal portion the resistance of which varies in a predetermined manner in response to strains transmitted by said two terminal portions, said two crystalline elements being disposed with facing inner side in overlapping relation on opposite sides of said member and each having the inner sides of its said terminal portions affixed to facing surface portions of said member for transmitting to said two effective element portions opposing strains in response to force strains applied between said remote member portions, said two crystalline elements having opposite gauge factors causing said two elements to be subjected to similarly directed resistance variations in response to oppositely directed internal strains within said two elements, and force means exerting holding forces on the outer side of one of said two terminal portions of each of said two crystalline elements and holding the inner side of said one terminal portion frictionally engaged with and affixed to the facing surface of said member and suppressing motion of said one terminal portion along its frictionally engaged member surface over a predetermined normal strain range applied to said element, said holding forces causing each said frictionally affixed terminal portion to move along said frictionally engaged member surface in response to predetermined excessive strains exceeding said normal strain range and suppressing application of excessive strains to said element, said effective intermediate crystal portion having only a fraction of the cross-section and being of more easily fractured material than its said two terminal portions.

9. In a mechano-electric strain transducer, an extended resilient member of substantial strength having two remote portions and an intermediate portion subject to strain transmitted thereto, two thin and flat fragile crystalline elements of a volume and strength much smaller than said resilient member, each having two opposite terminal portions and an effective intermediate portion the resistance of which varies in a predetermined manner in response to strains transmitted by said two terminal portions, said two crystalline elements being disposed with facing inner surfaces on opposite surfaces of said member and each having the inner surfaces of its said two terminal portions affixed to facing surface portions of said member for transmitting to said two effective element portions opposing strains in response to force strains applied between said remote member portions, said two crystalline elements having opposite gauge factors causing said two elements to be subjected to similarly directed resistance variations in response to oppositely directed internal strains within said two elements, and force means exerting holding forces on the outer surface of one of said two terminal portions of each of said two crystalline elements and holding the inner surface of each said one terminal portion frictionally engaged with and affixed to the facing surface of said member and suppressing motion of said one terminal portion along its frictionally engaged member surface over a predetermined normal strain range applied to said element, said holding forces causing each said frictionally affixed terminal portion to move along said frictionally engaged surface in response to predetermined excessive strains exceeding said normal strain range and suppressing application of excessive strains to said element.

10. In a mechano-electric strain transducer, an extended resilient member of substantial strength having two remote portions and an intermediate portion subject to strain transmitted thereto, two thin and flat fragile crystalline elements of a volume and strength much smaller than said resilient member, each having two opposite terminal portions and an effective intermediate portion the resistance of which varies in a predetermined manner in response to strains transmitted by said two terminal portions, said two crystalline elements being disposed with facing inner surfaces in overlapping relation on opposite surfaces of said member and each having the inner surfaces of its said two terminal portions affixed to facing surface portions of said member for transmitting to said two effective element portions opposing strains in response to force strains applied between said remote member portions, said two crystalline elements having opposite gauge factors causing said two elements to be subjected to similarly directed resistance variations in response to oppositely directed internal strains within said two elements, and force means exerting holding forces on the outer surface of one of said two terminal portions of each of said two crystalline elements and holding the inner surface of each said one terminal frictionally engaged with and affixed to the facing surface of said member and suppressing motion of said one terminal portion along its frictionally engaged member surface over a predetermined normal strain range applied to said element, said holding forces causing each said frcitionally affixed terminal portion to move along said frictionally engaged surface in response to predetermined excessive strains exceeding said normal strain range and suppressing application of excessive strains to said element.

11. In a mechano-electric transducer as claimed in claim 10, said force means comprising an elastic spring member having a mounting portion affixed to said resilient member and a force portion overlying and exerted said holding forces on said one terminal portion.

References Cited

UNITED STATES PATENTS

| | | | |
|---|---|---|---|
| 2,909,744 | 10/1959 | Giovanni | 338—6 |
| 2,997,548 | 8/1961 | De Vries | 179—100.41 |
| 3,002,056 | 9/1961 | Batsch et al. | 179—100.41 |
| 3,034,345 | 5/1962 | Mason | 338—2 |
| 3,084,300 | 4/1963 | Sanchez | 338—2 |
| 3,089,108 | 5/1963 | Gong et al. | 338—2 |
| 3,113,783 | 12/1963 | Zimmermann et al. | 179—100.41 |
| 3,144,522 | 8/1964 | Bernstein | 338—2 |
| 3,161,810 | 12/1964 | Broussard | 179—100.41 |
| 3,215,568 | 11/1965 | Pfann | 338—2 |

RICHARD M. WOOD, *Primary Examiner.*

W. D. BROOKS, *Assistant Examiner.*